May 21, 1957 C. SAGONA 2,792,802
INDICATING MEANS USEABLE PER SE AND AS PART
OF LENGTH-MEASURING INSTRUMENTS AND GAGES
Filed June 23, 1955
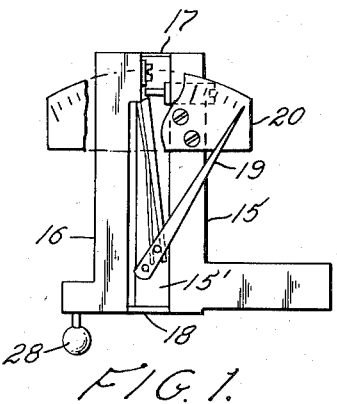
FIG. 1. FIG. 2.
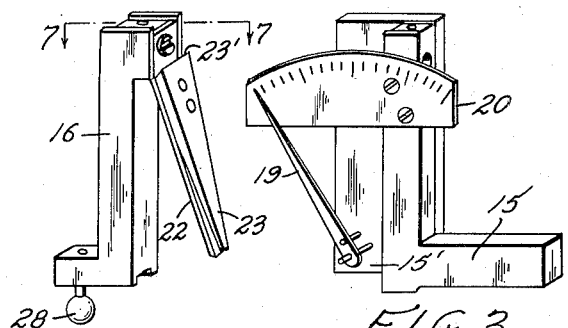
FIG. 3.
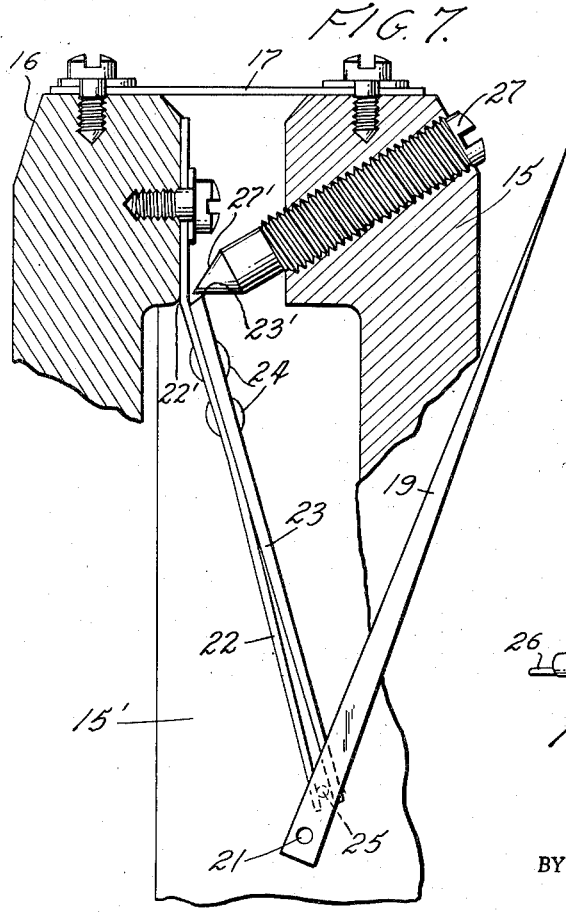
FIG. 7.
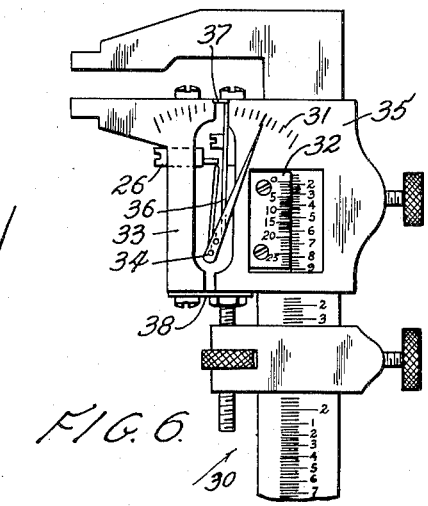
FIG. 6.
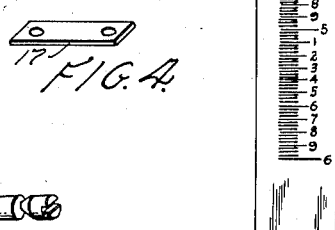
FIG. 4.
FIG. 5.
INVENTOR
CHARLES SAGONA
BY
ATTORNEY

United States Patent Office 2,792,802
Patented May 21, 1957

2,792,802

INDICATING MEANS USEABLE PER SE AND AS PART OF LENGTH-MEASURING INSTRUMENTS AND GAGES

Charles Sagona, Brooklyn, N. Y.

Application June 23, 1955, Serial No. 517,449

8 Claims. (Cl. 116—129)

The present invention relates to high precision measuring instruments and more particularly to a novel and improved indicating means for use as a dial indicator per se, or in conjunction with micrometers, calipers, height gages and the like, used by machinists, toolmakers and inspectors, and may be incorporated in the construction of such measuring instruments as for instance in the micrometer structure set forth in my Patent No. 2,674,806, over which the present invention is an improvement.

A dial indicating means of the type herein concerned with, utilizes a distortable parallelogram structure; the relative movement of its opposite sides being translated to move a swingable pointer across a graduated scale, a distance which is a magnification of the relative movement of such opposite parallelogram sides.

The principal object of this invention is to provide a novel and improved construction for such indicating means so that the initial or rest position of the pointer is adjustable. No such provision is made in the indicating means shown in said patent.

Another object hereof is to provide a novel and improved dial indicating means of the character described, wherein the means employed to effect the mentioned adjustment makes no change in any set form said parallelogram may be in and though the components comprising said adjustment means may wear, same would occasion no deviation in the precision of the indicating means.

A further object hereof is to provide a novel and improved indicating means of the class set forth which is reasonably cheap to manufacture, easy to use, and efficient in accomplishing the purposes for which it is designed.

Other objects and advantages will become apparent as this disclosure proceeds.

In the accompanying drawings, similar characters of reference indicate corresponding parts in all the views.

Fig. 1 is a front view of an indicating means embodying the teachings of this invention.

Fig. 2 is a perspective view of part of the device shown in Fig. 1.

Fig. 3 is a perspective view of other parts of said device in assembled relation.

Fig. 4 is a perspective view of one of the resilient parts forming part of the parallelogram structure as will be explained.

Fig. 5 is a perspective view of one form of element which may be used to effect the mentioned adjustment.

Fig. 6 is a front view of a vernier caliper incorporating the dial indicating means taught herein.

Fig. 7 is a fragmentary enlarged section taken at lines 7—7 in Fig. 2, but of the assembled device. The element used for adjustment, is here shown of modified construction.

In the drawings, the parallelogram structure which is distortable only into other parallelogram forms, is offered by the oppositely positioned spaced frame parts denoted generally by the numerals 15 and 16 respectively, which are joined by the oppositely positioned spaced resilient straps 17 and 18. Relative movement of said frame parts 15, 16 to distort said structure from one parallelogram form to another, causes a swingably mounted pointer 19 to move across the face of a dial 20 which is graduated to indicate the extent of such relative movement of said frame parts. Said pointer is carried on a rotatable pin shaft 21 which is journalled on an extension 15' of the frame part 15. The graduated dial 20 is mounted on said frame part 15. The construction so far described is well known in the art, for one adaptation of which, I make reference to my said patent.

Of importance is the means I employ to translate the relative movement of the frame parts to move the pointer 19, and the provision I make for the adjustment of the initial rest position of the pointer. I will now describe a preferred embodiment of the structure affording such features.

The device when in use, has one of its frame parts held stationary. In the embodiments shown in Figs. 1 and 7, the frame part 15 is the one so held, and from rest position, the frame part 16 is to be moved to cause pointer movement from its normal rest position. The part which carries the pointer also carries an initial rest position adjustment means therefor. The other frame part carries a deflectable blade spring in constantly-tensed condition, acting on the pointer. The said blade spring 22 presents an element 23, having a knife-edge in constant contact with the adjustment element.

More specifically, the blade spring 22 extends from the frame piece 16 in cantilever fashion and substantially diagonally of the parallelogram structure mentioned. Said blade spring carries therealong a strip 23 of rigid material secured thereto by the rivets 24. Said strip 23 rests against a pin 25 extending laterally from the pointer, at a point close to the pin shaft 21 and parallel thereto. Upon movement of the blade spring 22 towards the frame piece 16 it is mounted on, the pointer 19 will be moved towards frame piece 16. Upon return of the pointer towards its normal rest position, some means are provided to bring the pointer to move towards its initial rest position. For this purpose, I find it suitable to have the blade spring 22, and the element 23, to slightly pinch and hold the pin 25 between them; the pinch being only such as to provide a precision rotary fit for such pin, without any appreciable friction.

Very near the fulcrum point 22' about which the blade spring 22 bends, the strip element 23 presents a knife-edge 23' parallel to the axis of said fulcrum. An element of preferably circular cross-section, extends from the frame part 15 and bears against such knife-edge. Such element may for instance be the shown eccentric pin 26, or the conical tip 27' of the screw 27. It is evident that shift of position of said pin 26 or screw 27, will alter the position of the blade spring 22 about its fulcrum axis 22' and thus change the position of the pointer 19 along the dial 20. It is important that the spring 22 shall be weak in comparison to the resilient members 17, 18 so that movement of the blade spring 22 shall not effect the form of the parallelogram structure mentioned.

In adaptations where the initial rest position of the pointer has no need for adjustment, then of course, the stop means 26 and 27, as the case may be, are fixedly mounted.

The structure illustrated in Fig. 1 may serve as a dial indicator per se. It may be fitted with the usual sensitive measuring button or sphere 28 on its movable frame member 16; frame member 15 being held stationary when the device is in use in manner well known in tool and inspection rooms and on gage devices or in other manner used by machinists generally. A suitable casing not shown, may be provided, having a window for the dial 20, but leaving the sphere or "sensitive" button 28 exposed.

In Fig. 6, I have shown the indicator construction taught herein, applied as part of a vernier caliper 30. Here the dial 31 is calibrated to read in ten thousandths of an inch; thousandths of an inch being read on the vernier scale 32. Here the movable frame member 33 carries the pointer 34 and the adjustment element 26, while the blade spring 36 and its appurtenance is carried on the fixed frame part which here is the slide 35 of the caliper 30. The parallel blade springs are 37 and 38.

Without further illustration, it is evident to those versed in this art, that the indicator taught herein may be incorporated in all sorts of length-measuring gages, as for instance snap gages, height gages et cetera.

This invention is capable of numerous forms and various applications without departing from the essential features herein disclosed. It is therefore intended and desired that the embodiments illustrated herein shall be deemed illustrative and not restrictive and that the patent shall cover all patentable novelty herein set forth; reference being had to the following claims rather than to the specific description herein to indicate the scope of this invention.

I claim:

1. In an indicating device of the character described, a pair of spaced parallel blade springs, a pair of spaced frame members; said blade springs being securely mounted to and across said frame members whereby on movement of said frame members towards or away from each other, said blade springs remain parallel for all relative positions of said frame members; a third blade spring securely mounted on one of the frame members and extending into space therefrom, presenting an edge in such space which when pressed on will cause deflection of the third blade spring, a pointer swingably mounted on one of the frame members, means associated with the third blade spring and the pointer to move said pointer upon deflection of said third blade spring, an element extending from the second frame member, pressing against said edge, causing a deflection of the third blade spring while the frame members are in their normal rest position and causing a different deflection of said third blade spring when said frame members are relatively moved and means carried by one of the frame members for urging the pointer towards its norwal rest position; one of the frame members carrying indicia to indicate pointer movement.

2. The indicating device as defined in claim 1, wherein the third blade spring extends in cantilever fashion between the frame members and between said parallel pair of blade springs.

3. The indicating device as defined in claim 1, wherein all the blade springs bend along parallel lines when the frame parts move in relation to each other.

4. The indicating device as defined in claim 1, wherein the third blade spring bends along a line parallel to the axis of swing of the pointer when the frame parts move in relation to each other and including a round pin extending from the pointer in a direction parallel to said axis and spaced therefrom; the third blade spring carrying an elongated element therealong to form a clamp-like structure therewith; said pin being positioned between the third blade spring and said element and constantly contacted by both of them with negligible friction; said clamp-like structure constituting the means for urging the pointer towards its normal rest position.

5. The indicating means as defined in claim 1, wherein the element pressing against the mentioned edge is adjustably mounted and of a fom whereby when moved, said element will cause a change in the initial deflection of the third blade spring and determine thereby a new initial rest position for said third blade spring.

6. The indicating means as defined in claim 5, wherein the element pressing against the mentioned edge presents a cone whose conical surface bears on said edge; said element being mounted for movement along the axis of said cone and means associated with said element to hold it at any set position along its line of movement, whereby on movement of said element, the third blade spring occasions a change in its deflection.

7. The indicating means as defined in claim 5, wherein the element pressing against the mentioned edge, is eccentrically mounted and rotatable about an axis whereby the third blade spring occasions a change in its deflection upon movement of said element about said axis.

8. The indicating means as defined in claim 1, wherein the third blade spring is bent along a transverse line; said line being adjacent the frame member the third blade spring is mounted on and between said frame member and the mentioned edge.

References Cited in the file of this patent
UNITED STATES PATENTS

| | | |
|---|---|---|
| 1,234,656 | Glover | July 24, 1917 |
| 2,674,806 | Sagona | Apr. 13, 1954 |